(12) United States Patent
Cho

(10) Patent No.: US 11,339,838 B2
(45) Date of Patent: May 24, 2022

(54) CONTROL METHOD OF CLUTCH FOR VEHICLE

(71) Applicants: Hyundai Motor Company, Seoul (KR); Kia Motors Corporation, Seoul (KR)

(72) Inventor: Sung Hyun Cho, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 78 days.

(21) Appl. No.: 16/994,166

(22) Filed: Aug. 14, 2020

(65) Prior Publication Data

US 2021/0270331 A1 Sep. 2, 2021

(30) Foreign Application Priority Data

Feb. 28, 2020 (KR) .......................... 10-2020-0025328

(51) Int. Cl.
*F16D 48/06* (2006.01)

(52) U.S. Cl.
CPC ...... *F16D 48/06* (2013.01); *F16D 2500/3026* (2013.01); *F16D 2500/3065* (2013.01); *F16D 2500/30406* (2013.01); *F16D 2500/30412* (2013.01); *F16D 2500/50287* (2013.01)

(58) Field of Classification Search
CPC ............. F16D 48/06; F16D 2500/3026; F16D 2500/3027; F16D 2500/30406; F16D 2500/30412; F16D 2500/3065; F16D 2500/50287; F16D 2500/102; F16D 2500/30421; F16D 2500/5012; F16D 2500/5018; F16D 2500/50236; F16D 2500/50281
See application file for complete search history.

(56) References Cited

U.S. PATENT DOCUMENTS

| 2008/0220937 | A1* | 9/2008 | Nozaki ............... B60L 15/2054 477/86 |
| 2016/0377129 | A1* | 12/2016 | Cho ........................ F16D 48/06 701/51 |
| 2017/0130827 | A1* | 5/2017 | Ando ...................... F16D 48/06 |
| 2017/0166196 | A1* | 6/2017 | Park ...................... B60W 20/00 |

FOREIGN PATENT DOCUMENTS

KR 10-2019-0034991 A1 4/2019

* cited by examiner

*Primary Examiner* — Edwin A Young
(74) *Attorney, Agent, or Firm* — Morgan, Lewis & Bockius LLP

(57) ABSTRACT

A control method of a clutch for a vehicle may include determining whether or not learning of clutch characteristics is possible; learning the clutch characteristics when the learning of the clutch characteristics is possible; determining a clutch torque for controlling the clutch in consideration of a change amount in the clutch torque before and after the learning and controlling the clutch by the determined clutch torque; and determining whether or not it is difficult to continue to learn the clutch characteristics.

20 Claims, 3 Drawing Sheets

CONTROL METHOD OF CLUTCH FOR VEHICLE

CROSS REFERENCE TO RELATED APPLICATION

The present application claims priority to Korean Patent Application No. 10-2020-0025328, filed Feb. 28, 2020, the entire contents of which is incorporated herein for all purposes by this reference.

BACKGROUND OF THE INVENTION

Field of the Invention

The present invention relates to a control method of a clutch used in a transmission of a vehicle.

Description of Related Art

Among automatic manual transmissions (AMTs) or dual clutch transmissions (DCTs) mounted in a vehicle, there is a transmission that utilizes a dry clutch. During use of such a dry clutch (hereinafter, simply referred to as a "clutch"), characteristics of the dry clutch are relatively greatly changed. Therefore, it is preferable to learn the characteristics of the clutch as accurately as possible to utilize the characteristics of the clutch to control the clutch.

The characteristics of the clutch may be represented by a magnitude of a clutch torque with respect to a stroke of a clutch actuator driving the clutch, and may be represented by a torque-stroke (T-S) curve.

That is, a controller of the vehicle updates the T-S curve by learning the characteristics of the clutch as frequently and repeatedly as possible as long as a learning condition is satisfied, and then determines a stroke of the clutch actuator for implementing a desired clutch torque according to the T-S curve updated by the learning to control the clutch actuator.

At the time of learning the characteristics of the clutch, the stroke of the clutch actuator for an engine torque when a micro slip state, which is a state where the clutch slips in a very small slip amount of about 20 revolutions per minute (RPMs) is formed and maintained is learned.

A basic principle of the learning described above is an equation of motion that the engine torque is almost the same as the clutch torque in a situation in which the micro slip state as described above is constantly maintained.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a control method of a clutch for a vehicle configured for improving stability of learning of characteristics of the clutch by preventing micro slip control of the clutch from becoming unstable due to a change in the characteristics of the clutch caused by the learning and allowing the micro slip control to be stably maintained and configured for improving marketability of the vehicle by promoting accurate control of the clutch to prevent gear shifting impact, or the like, in learning the characteristics of the clutch in a vehicle in which a transmission using a dry clutch is mounted.

According to an exemplary embodiment of the present invention, a control method of a clutch for a vehicle includes: determining whether or not learning of clutch characteristics is possible, by a controller; learning the clutch characteristics by the controller when the learning of the clutch characteristics is possible; determining a clutch torque for controlling the clutch in consideration of a change amount in the clutch torque before and after the learning and controlling the clutch by the determined clutch torque, by the controller; and determining whether or not it is difficult to continue to learn the clutch characteristics, by the controller.

In the determining of whether or not the learning of the clutch characteristics is possible, in a case where a slip amount of the clutch is maintained within a predetermined first reference range for a first reference time, it may be determined that the learning of the clutch characteristics is possible.

The change amount in the clutch torque before and after the learning may be determined as a difference between a new clutch torque and an old clutch torque for a stroke of a clutch actuator immediately after the learning for implementing a clutch torque that has formed micro slip immediately before the learning.

The change amount in the clutch torque before and after the learning may be determined as a difference between a new clutch torque and an old clutch torque for a stroke of a clutch actuator immediately after the learning for implementing the same clutch torque as an engine torque immediately after the learning.

The clutch torque for controlling the clutch may be determined by summing an engine torque, a feedback torque, and the change amount in the clutch torque.

When it is determined that it is difficult to continue to learn the clutch characteristics, the learning may end, and when it is determined that it is possible to continue to learn the clutch characteristics, the learning of the clutch characteristics and the steps after the learning of the clutch characteristics may be repeated.

In the determining of whether or not it is difficult to continue to learn the clutch characteristics, in a case where a slip amount of the clutch is maintained in a state where the slip amount exceeds a predetermined second reference range for a second reference time, it may be determined that it is difficult to continue to learn the clutch characteristics.

The control method of a clutch for a vehicle may further include, before the determining of whether or not the learning of clutch characteristics is possible: determining whether or not micro slip control of the clutch is possible; and starting the micro slip control when the micro slip control is possible.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
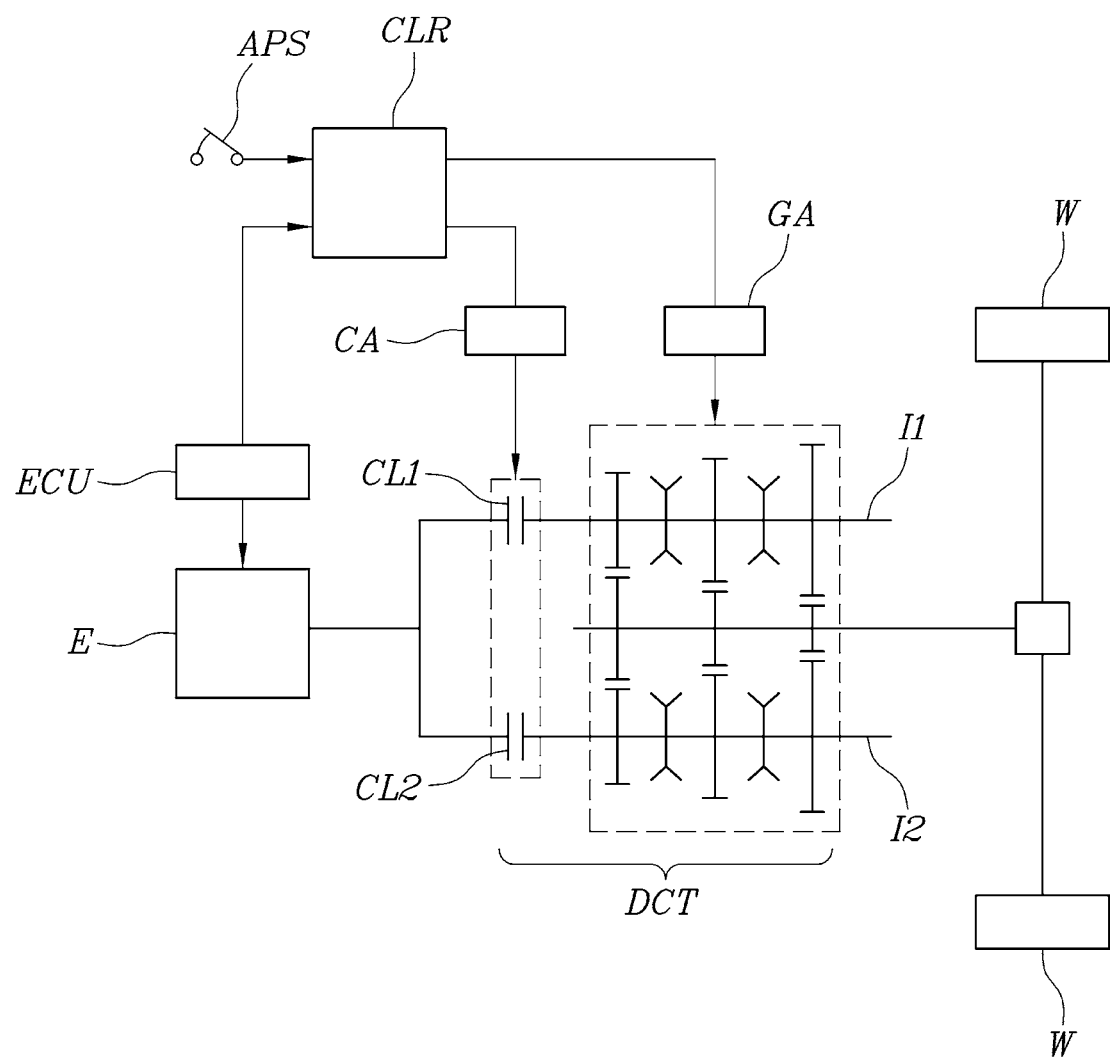
FIG. 1 is a view exemplarily illustrating a power train of a dual clutch transmission (DCT) vehicle to which an exemplary embodiment of the present invention may be applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

FIG. 1 illustrates a configuration of a dual clutch transmission (DCT) vehicle to which an exemplary embodiment of the present invention may be applied. In the dual-clutch transmission (DCT) vehicle, power of an engine E is selectively provided to two input shafts I1 and I2 through two clutches CL1 and CL2 of a DCT, and power to which gear shifting has been completed in the DCT is provided to driving wheels W.

A controller CLR is connected to an engine control unit (ECU) to receive information such as an engine torque and request the engine E to reduce a torque, and is connected to a clutch actuator CA controlling the two clutches of the DCT and a gear actuator GA changing a gear engagement state of the DCT to control the clutch actuator CA and the gear actuator GA.

The controller CLR is configured to receive a signal of an acceleration pedal sensor APS, and is configured to receive rotation speeds or the like of the respective input shafts I1 and I2 of the DCT.

The controller CLR may determine slip amounts of the two clutches through differences between a rotation speed of the engine E and the rotation speeds of the respective input shafts I1 and I2, respectively.

Figure 2:
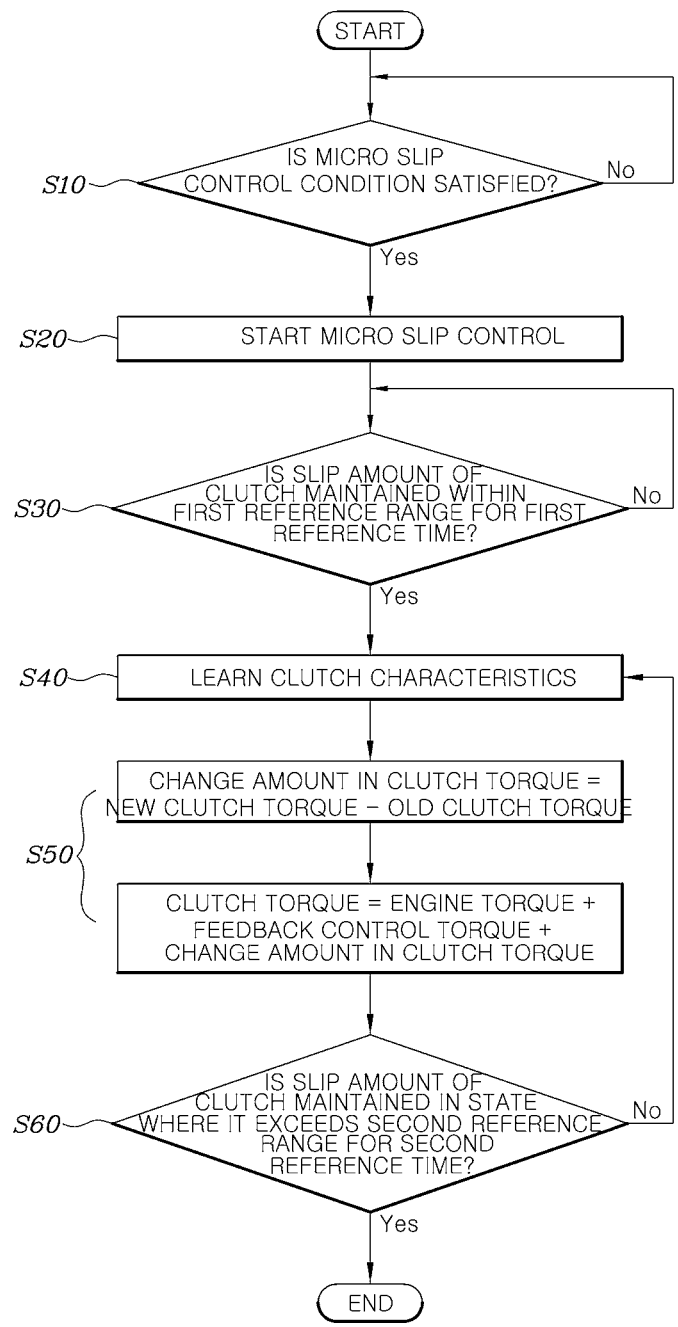
FIG. 2 is a flowchart illustrating an exemplary embodiment of a control method of a clutch for a vehicle according to an exemplary embodiment of the present invention.

FIG. 2 illustrates an exemplary embodiment of a control method of a clutch for a vehicle which may be applied to the vehicle including the clutches as described above. The control method of a clutch for a vehicle includes determining whether or not micro slip control of the clutch is possible, by the controller (S10); starting the micro slip control when the micro slip control is possible, by the controller (S20); determining whether or not learning of clutch characteristics is possible, by the controller (S30); learning the clutch characteristics by the controller when the learning of the clutch characteristics is possible (S40); determining a clutch torque for controlling the clutch in consideration of a change amount in the clutch torque before and after the learning and controlling the clutch by the determined clutch torque, by the controller (S50); and determining whether or not it is difficult to continue to learn the clutch characteristics, by the controller (S60).

That is, in an exemplary embodiment of the present invention, an unstable phenomenon of a slip state which may occur in a case of controlling a clutch depending on only newly learned clutch characteristics may be prevented by controlling the clutch in consideration of the change amount in the clutch torque before and after the learning while performing the learning of the clutch characteristics in a micro slip control state.

In the determining (S10) of whether or not the micro slip control of the clutch is possible, in a case where the engine torque of the vehicle is not rapidly changed and gear shifting is not being performed, it may be determined that a condition in which the micro slip control is possible is satisfied.

In an exemplary embodiment of the present invention, the engine torque of the vehicle is determined to not be rapidly changed if a change rate of the engine torque of the vehicle is lower than a predetermined rate.

That is, in a state in which the condition as described above is satisfied, the clutch may be stably maintained in a state of being finely slipped at a level of about 20 revolutions per minute (RPMs), and in such a state, the learning of the clutch characteristics is performed.

In the determining (S30) of whether or not the learning of the clutch characteristics is possible, in a case where a slip amount of the clutch is maintained within a predetermined first reference range for a first reference time, it is determined that the learning of the clutch characteristics is possible.

That is, the purpose of the determining (S30) of whether or not the learning of the clutch characteristics is possible is to allow the learning of the clutch characteristics to be performed only in a case where it is confirmed that the micro slip as described above is stably maintained, and is to first confirm a stable micro slip state, which is a precondition for securing accuracy of the learning, since the learning of the clutch characteristics is based on the fact that the engine torque may be considered as the clutch torque in a state where the micro slip of the clutch is maintained.

Therefore, the first reference range and the first reference time may be determined in a design manner by a plurality of experiments and analyses according to the purpose as described above. For example, the first reference range may be determined to be ±15 RPM, and the first reference time may be determined to be 1 sec.

The change amount in the clutch torque before and after the learning is determined as a difference between a new clutch torque and an old clutch torque for a stroke of the clutch actuator immediately after the learning for implementing the clutch torque that has formed to the micro slip immediately before the learning.

That is, the change amount in the clutch torque before and after the learning is determined as a difference between clutch torques before and after the learning for a stroke of one clutch actuator immediately after the learning.

This will be described with reference to FIG. 3.

Figure 3:
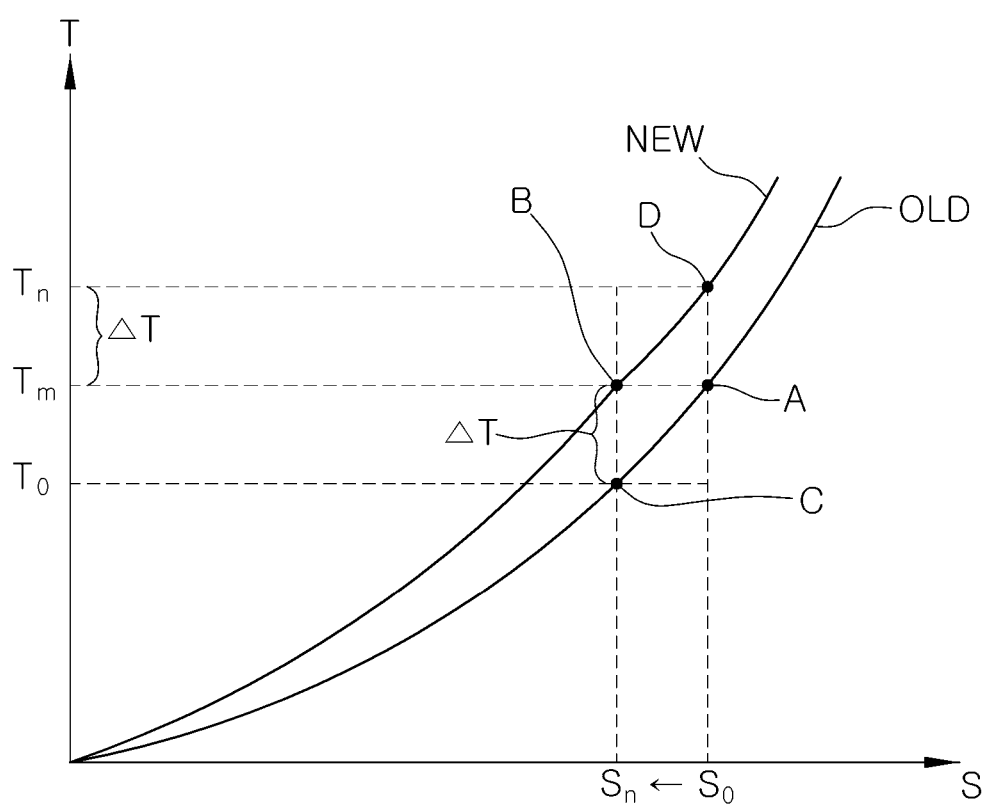
FIG. 3 is a graph for describing the control method of a clutch for a vehicle according to an exemplary embodiment of the present invention.

In FIG. 3, the clutch characteristics immediately before the learning are represented by an OLD curve, and the clutch characteristics immediately after the learning are represented by a NEW curve.

Point A in the OLD curve indicates that the stroke of the clutch actuator for forming the clutch torque Tm is So in a case where the micro slip of the clutch is stably maintained in a state where the clutch torque is Tm immediately before the learning.

That is, immediately before the learning, the stroke of the clutch actuator is controlled to be So such that the clutch forms the micro slip state. In the instant case, the clutch torque, which is a torque transferred by the clutch, will be almost the same as the engine torque.

When a curve of the clutch characteristics is changed as illustrated in the NEW curve of FIG. 3 by performing the learning of the clutch characteristics by several known methods according to the related art, the clutch torque determined by the controller to control the clutch to maintain the micro slip state of the clutch to be the same as that immediately before the learning is substantially the same as Tm.

The reason is that since the micro slip state is stably maintained, the engine torque is hardly changed, and in the instant state, the clutch torque and the engine torque are almost the same as each other.

Therefore, the controller CLR has determined a stroke of the clutch actuator which may implement the clutch torque Tm that has formed to the micro slip immediately before the learning to maintain the micro slip state even immediately after the learning, and has controlled the clutch actuator according to the stroke.

That is, since a curve representing the clutch characteristics immediately after the learning is the NEW curve, the controller finds point B from the NEW curve to implement the clutch torque Tm, and finds the stroke Sn of the clutch actuator by point B to drive the clutch actuator.

Therefore, the stroke of the clutch actuator is fluctuated by So–Sn before and after the learning. Such a fluctuation of the stroke causes collapse of the micro slip state of the clutch.

This may be considered as a phenomenon occurring since the stroke of the clutch actuator that has stably maintained the micro slip of the clutch immediately before the learning is suddenly changed immediately after the learning.

That is, since the learning of the clutch characteristics is performed within a very short time, when the stroke of the clutch actuator which may stably maintain the micro slip immediately before the learning is suddenly changed immediately after the learning, even though a change amount in the stroke becomes slightly large, it may be natural that the micro slip of the clutch collapses.

It is natural that the learning of the clutch characteristics is not always accurate, but has a deviation and an error. Therefore, due to phenomena according to substantial learning of the clutch characteristics which is not ideal as described above, in a case where the clutch characteristics before and after the learning are relatively greatly changed, the micro slip state may collapse to cause a situation where the learning may not be continued.

Therefore, in the instant case, in an exemplary embodiment of the present invention, the micro slip of the clutch may be stably maintained by controlling in consideration of a difference between the clutch characteristics immediately before the learning and the clutch characteristics immediately after the learning.

In an exemplary embodiment of the present invention, to prevent such a situation from occurring, as described above, the change amount in the clutch torque before and after the learning is found and is utilized to control the clutch immediately after the learning.

A process of controlling the clutch actuator immediately after the learning by the controller according to an exemplary embodiment of the present invention will be described.

Since an engine torque immediately after the learning of the clutch characteristics does not have a great difference from an engine torque immediately before the learning of the clutch characteristics, the clutch torque initially determined by the controller to control the clutch so that the micro slip of the clutch immediately before the learning may be stably maintained will be determined as Tm as described above. Therefore, when point B is selected on the NEW curve, an initial stroke of the clutch actuator immediately after the learning becomes Sn, which is the same as that in the related art.

In addition to this, in an exemplary embodiment of the present invention, the controller does not directly control the clutch actuator using the stroke of the clutch actuator determined as described above, but finds a difference between a new clutch torque, which is a clutch torque according to new clutch characteristics immediately after the learning, corresponding to the stroke Sn, and the old clutch torque, which is a clutch torque according to the clutch characteristics immediately before the learning, determines the difference as the change amount in the clutch torque, reflects the change amount in the clutch torque to again determine the clutch torque for controlling the clutch, again finds the stroke of the clutch actuator for implementing the clutch torque determined as described above, and controls the clutch actuator according to the found stroke.

That is, in an example of FIG. 3, the controller is configured to determine a new clutch torque for the stroke Sn of the clutch actuator immediately after the learning, for implementing the clutch torque Tm that has formed to the micro slip immediately before the learning, as point B on the NEW curve, determines the old clutch torque as point C on the OLD curve, and determines the change amount $\Delta T$ in the clutch torque, which is a difference between the clutch torques at point B and point C, by the following equation: $\Delta T = Tm - To$.

Alternatively, the change amount $\Delta T$ in the clutch torque before and after the learning may be determined as the difference between the new clutch torque and the old clutch torque for the stroke of the clutch actuator immediately after the learning for implementing the same clutch torque as the engine torque immediately after the learning. The reason is that since the micro slip is maintained, the engine torque immediately after the learning is almost the same as the clutch torque.

Subsequently, the controller again adds the change amount $\Delta T$ in the clutch torque to Tm to find Tn, finds point D for Tn on the NEW curve, finds a stroke ($\approx$So) of the clutch actuator corresponding to point D, and controls the clutch actuator by the stroke.

Here, the stroke of the clutch actuator corresponding to point D will be determined to be a value which is almost similar to or the same as So, which means that the stroke of the clutch actuator immediately before and immediately after the learning is hardly changed. Therefore, it may be seen that the micro slip state may be very stably continued.

For reference, equations for finding the clutch torque determined by the controller to control the clutch in the related art and in an exemplary embodiment of the present invention are as follows:

Equation according to the related art: Clutch torque=Engine torque+Feedback torque Equation according to an exemplary embodiment of the present invention: Clutch torque=Engine torque+Feedback torque+Change amount ΔT in clutch torque.

Here, in the equation according to the related art, in a case where the micro slip state is stably maintained, the feedback torque is almost close to 0, and when the feedback torque is ignored, the clutch torque becomes the same as the engine torque.

Furthermore, the feedback torque is a torque value determining in consideration of factors such as a clutch slip error, a change amount in a clutch slip error, a shifting stage, an engine torque, and a clutch speed. For example, a P component, an I component, and a D component may be found by a map for at least one of these factors and the feedback torque may be determined as a proportional integral derivative (PID) control amount determined by the sum of these components.

In the equation according to an exemplary embodiment of the present invention, when the feedback is considered as 0 as described above, Tn obtained by adding the change amount ΔT in the clutch torque to Tm, which is the clutch torque (≈engine torque) that has formed to the micro slip immediately before the learning in FIG. 3, as described above, becomes a clutch torque for substantially controlling the clutch, and the stroke of the clutch actuator for implementing point D on the NEW curve corresponding to Tn becomes a value almost close to So, as illustrated in FIG. 3.

Therefore, in an exemplary embodiment of the present invention, a change is hardly generated in the stroke of the clutch actuator before and after the learning performed while the micro strip state is stably maintained such that the micro slip of the clutch may be stably maintained without collapsing immediately after the learning unlike the related art. Accordingly, the clutch characteristics may be learned more accurately and by the larger number of times. As a result, the clutch is more accurately controlled to prevent impact of the vehicle and improve a gear shifting feeling or the like, resulting in significant improvement of marketability of the vehicle.

Meanwhile, when it is determined in the determining (S60) of whether or not it is difficult to continue to learn the clutch characteristics that it is difficult to continue to learn the clutch characteristics, the control ends, and when it is determined in the determining (S60) of whether or not it is difficult to continue to learn the clutch characteristics that it is possible to continue to learn the clutch characteristics, the learning (S40) of the clutch characteristics and the steps after the learning (S40) of the clutch characteristics are repeatedly performed.

Here, in the determining (S60) of whether or not it is difficult to continue to learn the clutch characteristics, in a case where a slip amount of the clutch is maintained in a state where the slip amount exceeds a predetermined second reference range for a second reference time, it is determined that it is difficult to continue to learn the clutch characteristics.

That is, it a case where it is determined that it is difficult to continue to learn the clutch characteristics since the slip amount of the clutch is excessively large, the learning and the control of the present invention end, and the second reference range and the second reference time may be determined in a design manner by a plurality of experiments and analyses according to the purpose as described above.

The second reference range and the second reference time may be determined at levels similar to those of the first reference range and the first reference time, respectively.

According to an exemplary embodiment of the present invention, in a vehicle in which a transmission using a dry clutch is mounted, it is possible to improve stability of learning of characteristics of the clutch by preventing micro slip control of the clutch from becoming unstable due to a change in the characteristics of the clutch caused by the learning and allowing the micro slip control to be stably maintained and improve marketability of the vehicle by promoting accurate control of the clutch to prevent gear shifting impact, or the like, in learning the characteristics of the clutch.

Furthermore, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a clutch for a vehicle, the method comprising:
   determining, by a controller, when learning of clutch characteristics is possible;
   learning, by the controller, the clutch characteristics upon determining that the learning of the clutch characteristics is possible;
   determining, by the controller, a clutch torque for controlling the clutch in consideration of a change amount in the clutch torque before and after the learning and controlling the clutch by the determined clutch torque; and
   determining, by the controller, when continuously learning the clutch characteristics is not possible.

2. The method of claim 1, wherein, in the determining of when the learning of the clutch characteristics is possible, in a case where a slip amount of the clutch is maintained within a predetermined first reference range for a first reference time, the controller is configured to conclude that the learning of the clutch characteristics is possible.

3. The method of claim 1, wherein the change amount in the clutch torque before and after the learning is determined as a difference between a new clutch torque and an old clutch torque for a stroke of a clutch actuator after the learning for implementing a clutch torque that has formed micro slip before the learning.

4. The method of claim 1, wherein the change amount in the clutch torque before and after the learning is determined as a difference between a new clutch torque and an old clutch torque for a stroke of a clutch actuator after the learning for implementing a same clutch torque as an engine torque after the learning.

5. The method of claim 1, wherein the clutch torque for controlling the clutch is determined by summing an engine torque, a feedback torque, and the change amount in the clutch torque.

6. The method of claim 1, wherein upon determining that the continuously learning the clutch characteristics is not possible, the controller is configured to end the learning, and upon determining that the continuously learning the clutch characteristics is possible, the controller repeats the learning of the clutch characteristics and steps after the learning of the clutch characteristics.

7. The method of claim 6, wherein, in the determining of when the continuously learning the clutch characteristics is not possible, in a case where a slip amount of the clutch is maintained in a state where the slip amount exceeds a predetermined second reference range for a second reference time, the controller is configured to conclude that the continuously learning the clutch characteristics is not possible and ends the learning.

8. The method of claim 1, further including, before the determining of when the learning of clutch characteristics is possible:
   determining when micro slip control of the clutch is possible; and
   starting the micro slip control upon determining that the micro slip control is possible.

9. The method of claim 8, wherein in a case where an engine torque of the vehicle is not changed more than a predetermined rate and a gear shifting of a transmission is not performed, the micro slip control is determined to be possible.

10. The method of claim 1, wherein the controller includes:
    a processor; and
    a non-transitory storage medium on which a program for performing the method of claim 1 is recorded and executed by the processor.

11. A non-transitory computer readable medium on which a program for performing the method of claim 1 is recorded.

12. A dual clutch transmission comprising:
    a first input shaft selectively connectable to an engine by a first clutch;
    a second input shaft selectively connectable to the engine by a second clutch;
    a plurality of gears mounted on the first input shaft and the second input shaft;
    a clutch actuator engaged to the first and second clutches and configured of controlling the first and second clutches;
    a gear actuator engaged to the plurality of gears and configured of changing a gear engagement between the plurality of gears for gear shifting;
    a controller connected to the clutch actuator and the gear actuator and including a processor and a non-transitory storage medium on which a program is recorded, the program executed by the processor and configured of performing:
       determining when learning of clutch characteristics of at least one of the first and second clutches is possible;
       learning the clutch characteristics upon determining that the learning of the clutch characteristics is possible;
       determining a clutch torque for controlling the clutch actuator in consideration of a change amount in the clutch torque before and after the learning and controlling the at least one of the first and second clutches by the determined clutch torque; and
       determining when continuously learning the clutch characteristics is not possible.

13. The dual clutch transmission of claim 12, wherein, in the determining of when the learning of the clutch characteristics is possible, in a case where a slip amount of the at least one of the first and second clutches is maintained within a predetermined first reference range for a first reference time, the controller is configured to conclude that the learning of the clutch characteristics is possible.

14. The dual clutch transmission of claim 13, wherein the change amount in the clutch torque before and after the learning is determined as a difference between a new clutch torque and an old clutch torque for a stroke of the clutch actuator after the learning for implementing a same clutch torque as an engine torque after the learning.

15. The dual clutch transmission of claim 12, wherein the change amount in the clutch torque before and after the learning is determined as a difference between a new clutch torque and an old clutch torque for a stroke of the clutch actuator after the learning for implementing a clutch torque that has formed micro slip before the learning.

16. The dual clutch transmission of claim 12, wherein the clutch torque for controlling the at least one of the first and second clutches is determined by summing an engine torque, a feedback torque, and the change amount in the clutch torque.

17. The dual clutch transmission of claim 12, wherein upon determining that the continuously learning the clutch characteristics is not possible, the controller is configured to end the learning, and upon determining that the continuously learning the clutch characteristics is possible, the controller repeats the learning of the clutch characteristics and steps after the learning of the clutch characteristics.

18. The dual clutch transmission of claim 17, wherein, in the determining of when the continuously learning the clutch characteristics is not possible, in a case where a slip amount of the at least one of the first and second clutches is maintained in a state where the slip amount exceeds a predetermined second reference range for a second reference time, the controller is configured to conclude that the continuously learning the clutch characteristics is not possible and ends the learning.

19. The dual clutch transmission of claim 12, further including, before the determining of when the learning of clutch characteristics is possible:

determining when micro slip control of the at least one of the first and second clutches is possible; and
 starting the micro slip control upon determining that the micro slip control is possible.

20. The dual clutch transmission of claim 19, wherein in a case where an engine torque of a vehicle associated with the dual clutch transmission is not changed more than a predetermined rate and a gear shifting of the transmission is not performed, the micro slip control is determined to be possible.

* * * * *